United States Patent
Hyuga et al.

(10) Patent No.: US 8,320,642 B2
(45) Date of Patent: Nov. 27, 2012

(54) FACE COLLATION APPARATUS

(75) Inventors: Tadashi Hyuga, Harakata (JP);
Yoshihisa Minato, Kyoto (JP); Miharu Sakuragi, Kyoto (JP); Yukiko Yanagawa, Nara (JP)

(73) Assignee: OMRON Corporation, Kyoto (JP)

( * ) Notice: Subject to any disclaimer, the term of this patent is extended or adjusted under 35 U.S.C. 154(b) by 996 days.

(21) Appl. No.: 12/349,772

(22) Filed: Jan. 7, 2009

(65) Prior Publication Data

US 2009/0175512 A1 Jul. 9, 2009

(30) Foreign Application Priority Data

Jan. 8, 2008 (JP) .................................. 2008-001350

(51) Int. Cl.
*G06K 9/00* (2006.01)

(52) U.S. Cl. ........................... 382/118; 715/700; 706/12

(58) Field of Classification Search .................... 382/118
See application file for complete search history.

(56) References Cited

U.S. PATENT DOCUMENTS

| 5,611,033 | A  | * | 3/1997 | Pitteloud et al. | ............. | 345/629 |
| 6,774,917 | B1 | * | 8/2004 | Foote et al. | ................... | 715/700 |
| 7,318,051 | B2 | * | 1/2008 | Weston et al. | .................. | 706/12 |
| 7,519,567 | B2 | * | 4/2009 | Luo | ................. | 706/45 |
| 2002/0090116 | A1 | * | 7/2002 | Miichi et al. | .................. | 382/118 |

FOREIGN PATENT DOCUMENTS

| JP | 2000-163092 A | 6/2000 |
| JP | 2001-101406 A | 4/2001 |

* cited by examiner

*Primary Examiner* — Hadi Akhavannik
(74) *Attorney, Agent, or Firm* — Osha Liang LLP

(57) ABSTRACT

A face collation apparatus has a storage that stores a feature quantity of at least one registrant, the feature quantity being extracted from a registration image of the registrant, a feature quantity extractor that extracts a feature quantity from a collation image of a collation object person, a score calculator that calculates a score indicating an analogy degree between the feature quantity of the registrant and the feature quantity of the collation object person, a score adjuster that adjusts the score using a score adjustment parameter so that any one of a stranger acceptance rate indicating a probability that a stranger is accepted at the time of collation, a principal rejection rate indicating a probability that a principal is rejected at the time of collation, and an equal error rate, which is a probability that the stranger acceptance rate and the principal rejection rate are equal, becomes substantially constant regardless of a registration condition and/or a collation condition, and a determination unit that determines whether the collation object person is the registrant by comparing the adjusted score and a predetermined threshold.

16 Claims, 11 Drawing Sheets

Fig. 5

| Factor | Assumed item | Adjustment method |
|---|---|---|
| No. of registrants | As registrants increase, score when stranger is collated is likely to become higher. | Adjustment is performed so as to make score lower with increase in registrant. |
| No. of registration images (of related registrant) | When stranger is collated, collation with respect to registrant whose No. of registration images is larger is likely to result in higher score. | Adjustment is performed so as to make score lower with increase in No. of registration images. |
| Elapsed time since registration image is photographed | When registration image is old, score when registrant is collated becomes lower. | Adjustment is performed so as to make score higher as registration image is older. |
| Photographing No. of collation images | As photographing No. is larger, score is likely to become higher when stranger is collated. | Adjustment is performed so as to make score lower with increase in photographing No. |
| Property of imaging device S/N ratio | Score is affected by difference in S/N ratio of imaging devices that photograph registration image and collation image. | Score is adjusted in accordance with combination of S/N ratios. |
| Property of imaging device Shutter speed | Score is affected by difference in shutter speed of imaging devices that photograph registration image and collation image, respectively. | Score is adjusted in accordance with combination of shutter speeds. |
| Property of imaging device Exposure degree | Score is affected by difference in exposure degree of imaging devices that photograph registration image and collation image, respectively. | Score is adjusted in accordance with combination of exposure degrees. |
| Property of imaging device Focal distance | Score is affected by difference in focal distance of imaging devices that photograph registration image and collation image, respectively. | Score is adjusted in accordance with combination of focal distances. |
| Face size | Score is affected by difference in size between face detected from registration image and face detected from collation image. | Score is adjusted in accordance with combination of face sizes. |
| Lighting environment | Score is affected by difference in lightning environment between face detected from registration image and face detected from collation image. | Adjustment is performed in accordance with combination of lighting environments. |
| Invisibility of face organ | Score is adjusted by difference in invisibility of face organ in face detected from registration image and face detected from collation image. | Score is adjusted in accordance with combination of states where face organ is invisible. |
| Face direction | Score is affected by difference in face direction between face detected from registration image and face detected from collation image. | Score is adjusted in accordance with combination of face directions. |
| Facial expression | Score is affected by difference in facial expression between face detected from registration image and face detected from collation image. | Score is adjusted in accordance with combination of facial expressions. |
| Physical feature | Stranger whose face is analogous is accepted. | Score is adjusted in accordance with physical feature. |
| Attribute | Stranger whose face is analogous is accepted. | Score is adjusted in accordance with attribute. |
| Reliability of face detection | When reliability of face detected from collation image is low, reliability of collation result also becomes low. | Adjustment is performed so as to make score lower when reliability is low. |
| Reliability of feature quantity | When reliability of feature quantity extracted from collation object person is low, reliability of collation result also becomes low. | Adjustment is performed so as to make score lower when reliability is low. |

FACE COLLATION APPARATUS

BACKGROUND OF THE INVENTION

1. Technical Field

The present invention relates to a face collation apparatus that collates a face image.

2. Related Art

Collation accuracy of a face collation apparatus largely depends on a registration condition of a registrant and a collation condition with respect to a collation object person, and the like.

As the registration condition, there are cited, for example, a number of registrants, a number of registration images of the relevant registrant, properties of an imaging device that photographs the registration images (an S/N ratio, shutter speed, exposure, focal distance, photographing number, etc.), and a face size, a lighting environment, invisibility of a face organ, a face direction in the registration image, and so on.

As the collation condition, there are cited, for example, an elapsed time since the registration image is photographed, properties of an imaging device that photographs a collation image, a photographing number of collation images, and a face size, a lighting environment, invisibility of a face organ, a face direction, reliability of face detection, reliability of a feature quantity in the collation image, and so on.

Specifically, when a person other than registrants is collated, as a number of registrants increases, probability that a person resembling the relevant stranger appears among the plurality of registrants becomes higher. Therefore, as the number of registrants increases, a higher score is calculated as an average. In a situation where only one threshold is set for determining whether or not the collation object person is the registrant, the above-described fluctuations in score result in fluctuations in likelihood of acceptance of the stranger (stranger acceptance rate).

These fluctuations in stranger acceptance rate due to the condition means that authentication accuracy of the apparatus fluctuates depending on the condition. In order to perform the face collation at stable authentication accuracy, a face collation apparatus capable of face collation in which the stranger acceptance rate does not depend on the registration condition and the collation condition has been desired.

Conventionally, in order to deal with this problem, an ex-ante adjustment such as finding a correction value of a score matching the condition of the apparatus, finding an appropriate threshold and the like has been performed every time the apparatus is installed.

However, adjustment every time the apparatus is installed is largely burdensome for a user, and inefficient.

As examples of the above-described collation apparatus, there are inventions described in Japanese Patent Application Laid-Open No. 2000-163092, and Japanese Patent Application Laid-Open No. 2001-101406.

SUMMARY

One or more embodiments of the present invention provides a technique for performing stable face collation regardless of a registration condition and a collation condition.

In accordance with one aspect of the present invention, a first face collation apparatus includes a storage that stores a feature quantity of at least one or more registrants, the feature quantity being extracted from a registration image of the registrant, a feature quantity extractor that extracts a feature quantity from a collation image of a collation object person, a score calculator that calculates a score indicating an analogy degree between the feature quantity of the registrant and the feature quantity of the collation object person, a score adjuster that adjusts the score using a score adjustment parameter so that any one of a stranger acceptance rate indicating probability that a stranger is accepted at the time of collation, a principal rejection rate indicating probability that a principal is rejected at the time of collation, and an equal error rate, which is probability that the stranger acceptance rate and the principal rejection rate are equal, becomes substantially constant regardless of a registration condition and/or a collation condition, and a determination unit that determines whether or not the collation object person is the registrant by comparing the adjusted score and a predetermined threshold.

In the first collation apparatus according to one or more embodiments of the present invention, the score calculated by the calculator is adjusted using the score adjustment parameter. The adjustment is performed so that any one of the stranger acceptance rate, the principal rejection rate and the equal error rate becomes substantially constant regardless of the registration condition and the collation condition.

While the adjustment of the score may be performed in any method, taking one example, learning using a stranger image and a principal image may be performed for each condition to calculate the score adjustment parameter, and using the calculated score adjustment parameter, the score may be adjusted.

Any score adjustment parameter that brings about an effect of making the stranger acceptance rate, the principal rejection rate, or the equal error rate substantially constant regardless of the registration condition and the collation condition may be employed. That is, it is only needed that a difference in stranger acceptance rate or the like due to the registration condition or the collation condition only is made smaller as compared with that before the adjustment. This conversion enables the face collation with less fluctuation in stranger acceptance rate or the like due to the registration condition or the collation condition to be performed. That is, this constitution can reduce burden of a user of adjustment every time the apparatus is installed, and enables efficient and stable face collation to be performed.

Moreover, in accordance with one aspect of the present invention, a second face collation apparatus includes a storage that stores a feature quantity of at least one or more registrants, the feature quantity being extracted from a registration image of the registrant, a feature quantity extractor that extracts a feature quantity from a collation image of a collation object person, a score calculator that calculates a score indicating an analogy degree between the feature quantity of the registrant and the feature quantity of the collation object person, a threshold adjuster that adjusts a predetermined threshold for determining whether or not the collation object person is the registrant using a threshold adjustment parameter so that any one of a stranger acceptance rate indicating probability that a stranger is accepted at the time of collation, a principal rejection rate indicating probability that a principal is rejected at the time of collation, and an equal error rate, which is probability that the stranger acceptance rate and the principal rejection rate are equal, becomes substantially constant regardless of a registration condition and/or a collation condition, and a determination unit that determines whether or not the collation object person is the registrant by comparing the calculated score and the adjusted threshold.

In the second face collation apparatus according to one or more embodiments of the present invention, the predetermined threshold is adjusted using the threshold adjustment parameter. The adjustment is performed so that any one of the stranger acceptance rate, the principal rejection rate or the equal error rate becomes substantially constant regardless of the registration condition and the collation condition. This brings about an effect similar to the effect obtained in the first face collation apparatus. That is, efficient and stable face collation detection can be performed.

It is preferable that the registration condition at least includes a number of registrants, a number of registration images of the relevant registrant, a property of an imaging device that photographs the registration image, or a face size, a lighting environment, invisibility of a face organ, a face direction or change in facial expression in the registration image. By restraining the fluctuations in stranger acceptance rate or the like due to at least any one of these conditions, it becomes unnecessary for the user to adjust the condition, which enables efficient and stable face collation to be performed.

It is preferable that the collation condition at least includes an elapsed time since the registration image is photographed, a property of an imaging device that photographs the collation image, a photographing number of collation images, or a face size, a lighting environment, invisibility of a face organ, a face direction, change in facial expression, reliability of face detection or reliability of the feature quantity in the collation image. Similar to the above-described registration condition, by restraining the fluctuations in stranger acceptance rate or the like due to at least any one of these conditions, it becomes unnecessary for the user to adjust the condition, which enables efficient and stable face collation to be performed.

It is preferable that if the score calculated by the score calculator is S, the score after adjustment is S', the number of registrants is N, and the score adjustment parameter is P, $$S'=S/P$$

$$P=f(N)=A+B\times\log N$$

where A, B are coefficients.

It is preferable that if the score calculated by the score calculator is S, the score after adjustment is S', the face size detected from the registration image is $R_X$, the face size detected from the collation image is $R_X'$, and the score adjustment parameter is P, the score adjustment parameter is as follows:

$$S'=S/P$$

$$P=f(R_X,R_X'),$$

where if $R_1<R_2$, $R_1'<R_2'$, $R_1=R_1'$, and $R_2=R_2'$, $f(R_X,R_X')$ is as follows:

$$f(R_1,R_2')=f(R_2,R_1')\leq f(R_2,R_2')\leq f(R_1,R_1').$$

It is preferable that if the predetermined threshold is $S_L$, the threshold after adjustment is $S_L'$, the number of registrants is N, and the threshold adjustment parameter is $P_L$, $$S_L'=S_L\times P_L$$

$$P_L=f(N)=A+B\times\log N$$

where A, B are coefficients.

It is preferable that if the predetermined threshold is $S_L$, the threshold after adjustment is $S_L'$, the face size detected from the registration image is $R_X$, the face size detected from the collation image is $R_X'$, and the threshold adjustment parameter is $P_L$, the threshold adjustment parameter is as follows:

$$S_L'=S_L\times P_L$$

$$P_L=f(R_X,R_X')$$

where if $R_1<R_2$, $R_1'<R_2'$, $R_1=R_1'$, and $R_2=R_2'$, $f(R_X,R_X')$ is as follows:

$$f(R_1,R_2')=f(R_2,R_1')\leq f(R_2,R_2')\leq f(R_1,R_1').$$

By using the above-described expressions as the score adjustment parameter and the threshold adjustment parameter, the score can be adjusted so that the stranger acceptance rate becomes substantially constant even if the number of registrants and the face sizes detected from the registration image/the collation image differ. This makes it unnecessary that the user performs the adjustment to match these conditions every time the apparatus is installed, which enables efficient and stable collation to be performed.

Moreover, one or more embodiments of the present invention may be apprehended as a face collation apparatus having at least part of the above-described units, or may be apprehended as a face collation method including at least part of the above-described processing, or as a face collation program for realizing the above-described method or a recording medium that records the program. The above-described units and processing can be combined to one another as much as possible to constitute one or more embodiments of the present invention.

According to one or more embodiments of the present invention, stable face collation can be performed regardless of the registration condition or the collation condition.

BRIEF DESCRIPTION OF THE DRAWINGS

FIG. 5 shows a diagram illustrating specific examples of various registration conditions and collation conditions, items assumed to be caused by differences in condition, rough score adjustment methods for addressing the items;

DETAILED DESCRIPTION

Figure 1:
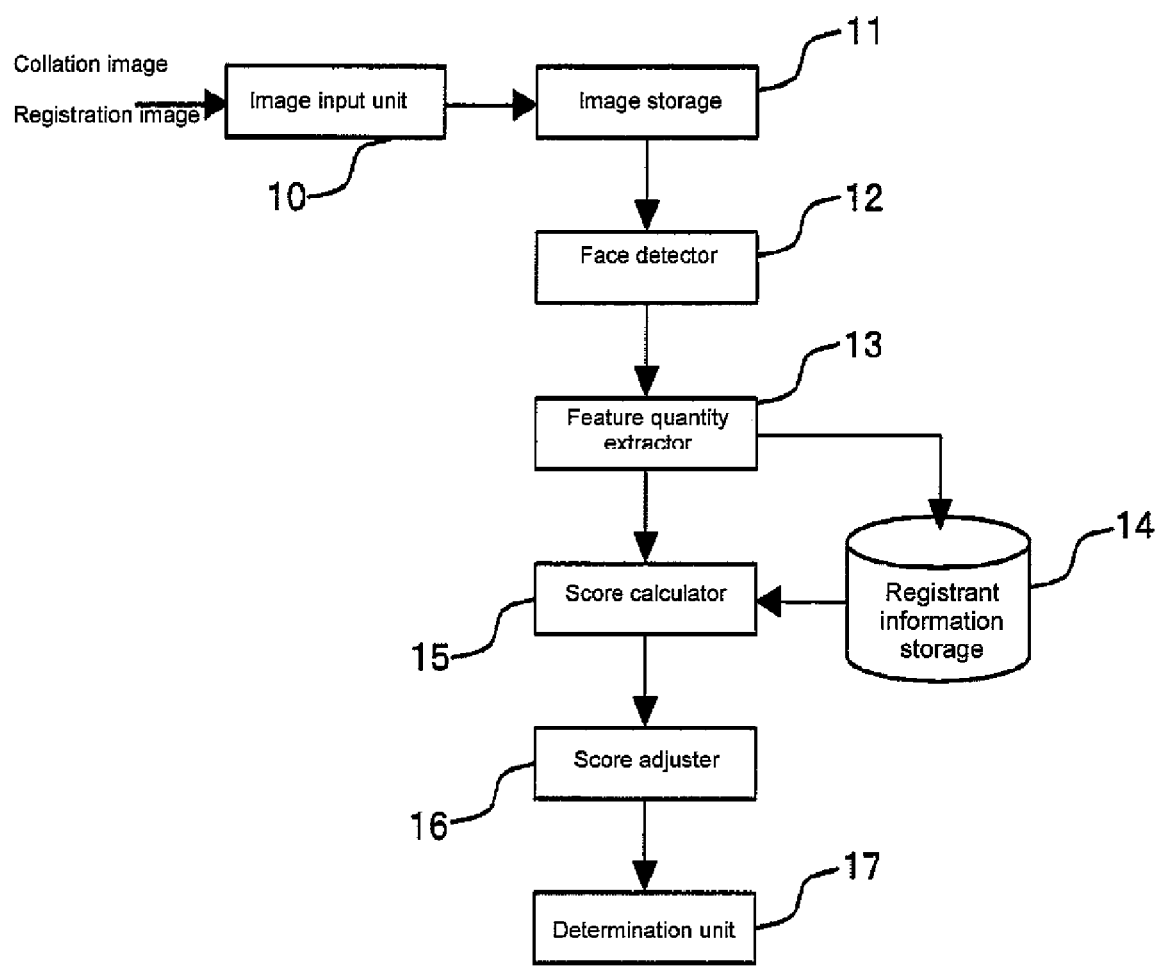
FIG. 1 shows a block diagram illustrating a functional configuration of a face collation apparatus according to a first embodiment.

Hereinafter, referring to the drawings, preferred embodiments of the present invention are illustratively described in detail.

<First Embodiment>

In a first embodiment, a constitution in which in order to perform efficient and stable face collation, a score calculated from a feature quantity of a registrant and a feature quantity of a collation object person is adjusted is described.

<Apparatus Configuration>

FIG. 1 is a block diagram showing a functional configuration of a face collation apparatus according to a first embodiment of the present invention. This face collation apparatus is an apparatus that performs principal authentication or personal identification of a collation object person using a face image, and can be applied to various use applications such as a security apparatus in a computer or a cellular phone with a camera, a monitoring apparatus that performs intruder detection, an apparatus that performs entry and exit management or locking control of a door, and so on, for example.

The face collation apparatus according to the first embodiment includes a plurality of functional elements shown in FIG. 1, that is, an image input unit 10, an image storage 11, face detector 12, a feature quantity extractor 13, a registrant information storage 14, a score calculator 15, a score adjuster 16, and a determination unit 17. In the present embodiment, these functional elements are realized by an arithmetic operation processing device executing software (program) and controlling hardware resources of a storage device, an imaging device, an input device and the like as needed. However, these functional elements may be configured by a dedicated chip.

The image input unit 10 is an interface for inputting a face image of a registrant (registration image) and a face image of a collation object person (collation image) to the face collation apparatus, and may be configured using any existing technique. For example, in the case where the registration image and the collation image are inputted through a network, a network interface corresponds to the image input unit, and in the case where the registration image and the collation image are inputted from external equipment such as a digital camera, a scanner, a computer, a storage device and the like, a communication interface that connects the external equipment and the face collation apparatus by a cable or wirelessly corresponds to the image input unit. Further, in the case where the registration image and the collation image are inputted from a recording medium such as a memory, a CD, a DVD and the like, a reader of the recording medium corresponds to the image input unit. Moreover, when the face collation apparatus includes an imaging device including a CCD, a CMOS sensor or the like, so that the registrant and the collation object person are photographed by the imaging device, the imaging device corresponds to the image input unit.

The image storage 11 is a storage device that temporarily stores an image to be processed. As this storage device, any specific technique such as volatile memory, nonvolatile memory and the like can be applied.

The face detector 12 has a function of detecting a face from an image by image processing. Any technique of existing face detection processing may be applied to the face detection processing by the face detector 12. Taking some examples, there are a method of detecting a face by template matching using a reference template corresponding to an outline of an entire face, a method of detecting a face by template matching based on face organs (eyes, nose, ears and the like), a method of detecting a top such as a head by chroma-key processing, and detecting a face based on this top, a method of detecting an area close to a color of complexion to determine this area to be a face, a method of performing learning by a teacher signal using a neural network to detect a face-like area as a face, and so on.

The feature quantity extractor 13 has a function of extracting a feature quantity from the face detected by the face detector 12. The feature quantity extractor 13, for example, detects feature points from the face detected by the face detector 12 to extract the feature quantities from the feature points. The feature points are characteristic points such as both ends of a mouth, outer corners of eyes, inner corners of eyes, and a tip of a nose. Any type of the feature quantity may be employed, and for example, a gray value in the vicinity of the relevant feature point, periodicity, directionality thereof, a positional relation between the feature points, and the like may be employed as the feature quantity. A number of the feature quantities can be arbitrarily set in accordance with expected collation accuracy. In the present embodiment, a combination of the plurality of feather quantities is referred to a vector or feature vector. Any technique of the existing feature-point detection processing may be applied to the feature-point detection processing by the feature quantity extractor 13. Taking some examples, there are a method of learning a pattern showing positions of the feature points and performing matching using the leaning data to detect the feature points, a method of detecting the feature points by pattern matching inside the detected face, and so on, and thus, any existing method may be used.

The registrant information storage 14 is a storage that stores the feature quantity extracted from the registration image. For this storage device, any specific technique such as a nonvolatile memory, a hard disk and the like may be applied. A number of registrants stored in the registrant information storage 14 may be one or more.

For the registration image and the collating image, the different image input units 10, image storages 11, face detectors 12, and feature quantity extractors 13 may be used, respectively.

The score calculator 15 has a function of calculating a score by comparing the feature quantity of the registrant stored in the registrant information storage 14, and the feature quantity extracted from the collation image. The score is an analogy degree between the feature quantity of the registrant and the feature quantity of the collation object person.

While it is possible to determine whether or not the collation object person is the registrant by the relevant analogy degree, a difference in value of the score likely to be calculated is caused by a difference in registration condition and collation condition. Therefore, probability that a stranger is accepted at the time of collation (stranger acceptance rate) also largely fluctuates due to the registration condition and the collation condition, so that stable determination accuracy cannot be assured. If the registration condition and the collation condition (described later) can be assumed based on an installation situation of the apparatus, a correction value of the score, a threshold for determining whether or not the collation object person is the registrant, and so on can be adjusted based on the relevant installation situation, however, performing such adjustment every time the apparatus is installed is not efficient. Consequently, in the present embodiment, the score adjustor 16 described below is provided.

The score adjustor 16 has a function of adjusting the score using a score adjustment parameter. The score adjustment parameter may be incorporated in the relevant face collation apparatus as a program, or a constitution may be employed in which a score adjustment parameter may be stored in the storage device in advance, and be read from the storage device as needed. The score adjustment parameter is a parameter enabling the score to be adjusted so that the stranger acceptance rate can be substantially constant regardless of the registration condition and the collation condition. Specifically, the score parameter can be determined as a function of each of the registration condition and the collation condition.

The registration condition includes, for example, a number of registrants, a number of registration images of the relevant registrant, properties of an imaging device that photographs the registration image, and a face size, a lighting environment, invisibility of a face organ, a face direction and change in facial expression in the registration image, and so on.

The collation condition includes, for example, an elapsed time since the relevant registration image is photographed, properties of an imaging device that photographs the collation image, a photographing number of collation images, and a face size, a lighting environment, invisibility of a face organ, a face direction, change in facial expression, reliability of the face detection, and reliability of the feature quantity in the relevant collation image, and so on.

In the present embodiment, the score adjustment parameter in view of any one or more of the above-described registration conditions and the collation conditions is used. The score adjustment parameter will be described later in detail, using examples.

The determination unit 17 has a function of determining whether or not the collation object person is the registrant by comparing the score adjusted by the score adjustor 16 and a predetermined threshold.

<Face Collation Function>

Figure 2:
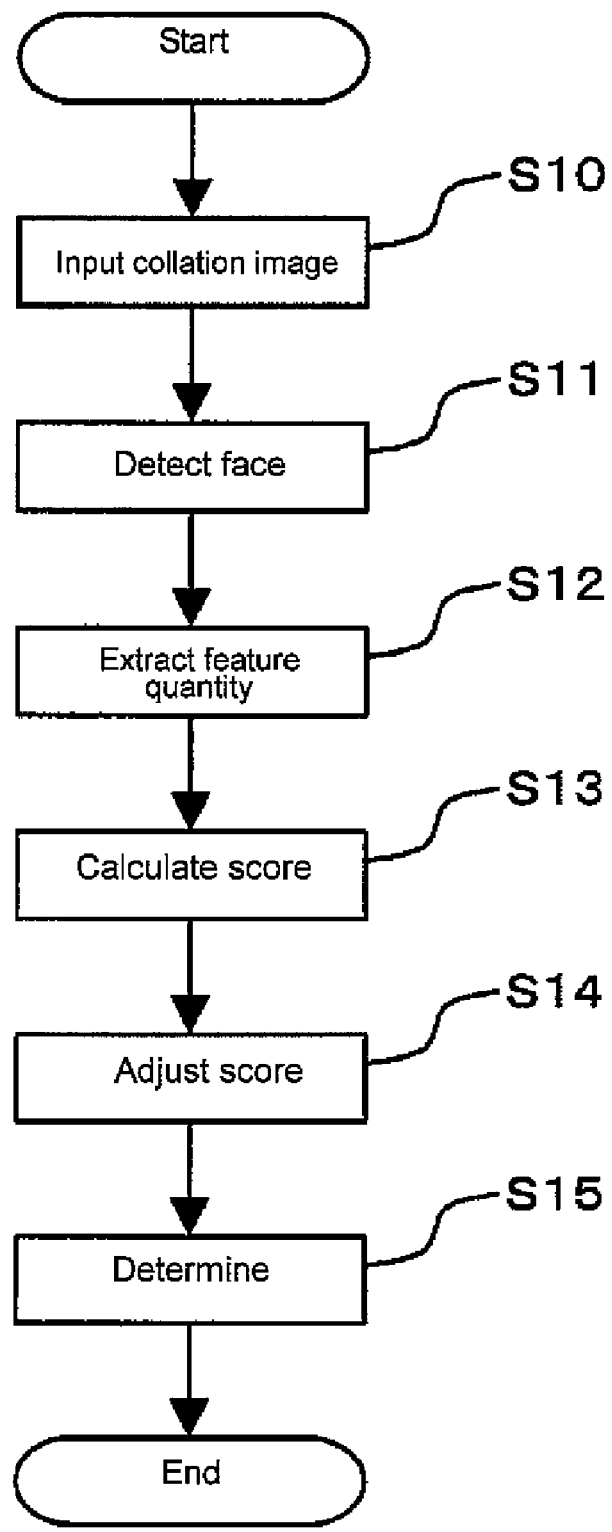
FIG. 2 shows a flowchart illustrating a flow of processing of the face collation apparatus according to the first embodiment.

A flow of a configuration and processing of the face collation function is described along a flowchart in FIG. 2.

When the face collation function is actuated, a collation image is inputted from the image input unit 10 (step S10). The inputted collation image is stored in the image storage 11.

Next, the face detector 12 detects a human face from the collation image inputted in step S10 and specifies a position, a size and the like of the face (step S11).

The feature quantity extractor 13 extracts a feature quantity from the face detected in step S11 (step S12).

Next, the score calculator 15 calculates an analogy degree (score) between a feature quantity of the registrant stored in the registrant information storage 14, and the feature quantity extracted in step S12 (step S13).

The score adjustor 16 adjusts the score calculated in step S13 using the score adjustment parameter (step S14).

Next, the determination unit 17 determines whether or not the person in the collation image inputted in step S10 is the registrant by comparing the score adjusted in step S14 and the predetermined threshold (step S15).

Now, examples of the score adjustment parameter are described.

<Score Adjustment Parameter 1>

As described above, the score adjustment parameter is for adjusting the score calculated by the score calculator 15. Specifically, the score adjustment parameter is determined so as to restrain fluctuations in stranger acceptance rate due to a difference in registration condition and collation condition.

Hereinafter, a case where the number of registrants (1, 10, 100) is used as the condition is described.

Figure 3A:
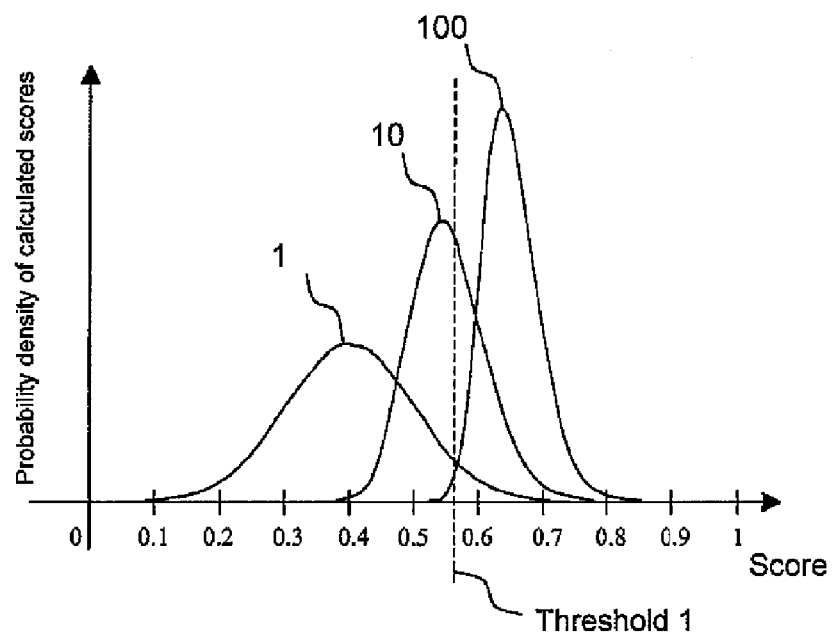
FIG. 3 shows a diagram indicating one example of a score adjustment parameter, FIG. 3A showing a schematic diagram indicating score calculation results with a number of registrants used as a condition when a plurality of stranger images are used, and FIG. 3B showing a schematic diagram indicating scores adjusted in accordance with the number of registrants.

FIG. 3A is a schematic diagram indicating calculation results of the scores by the score calculator 15 when a plurality of stranger images are used. FIG. 3A is a graph with a horizontal axis defined as the "score", and with a vertical axis defined as a "probability density of the calculated scores" (in either axis, a range of a value varies depending on the definition, for example, in FIG. 3A, standardization is performed so that a maximum value of the score is 1). That is, FIG. 3A indicates "what degree of score is likely to be calculated when the strangers are subjected to the face collation" on each condition. From the example of FIG. 3A, it can be understood that as the number of registrants increases, the value of the score likely to be calculated rises. This means that the larger the number of registrants is, the higher the probability that a person resembling the stranger appears among the registrants is.

In this case, if a threshold 1 is set to a value (score) that can appropriately exclude a stranger when the number of registrants is 1, as shown in FIG. 3A, as the number of registrants increases, a higher score than the above-described threshold is likely to be calculated when a stranger is collated. That is, a stranger is likely to be accepted as the registrant. Consequently, in the present embodiment, the following expressions are used to adjust the score.

If the score calculated by the score calculator 12 is S, the score after adjustment is S', the number of registrants is N, and the score adjustment parameter is P, $$S' = S/P$$

$$P = A + B \times \log N$$

where A, B are coefficients. In the present embodiment, the coefficient A=1, and the coefficient B=0.5.

Figure 3B:
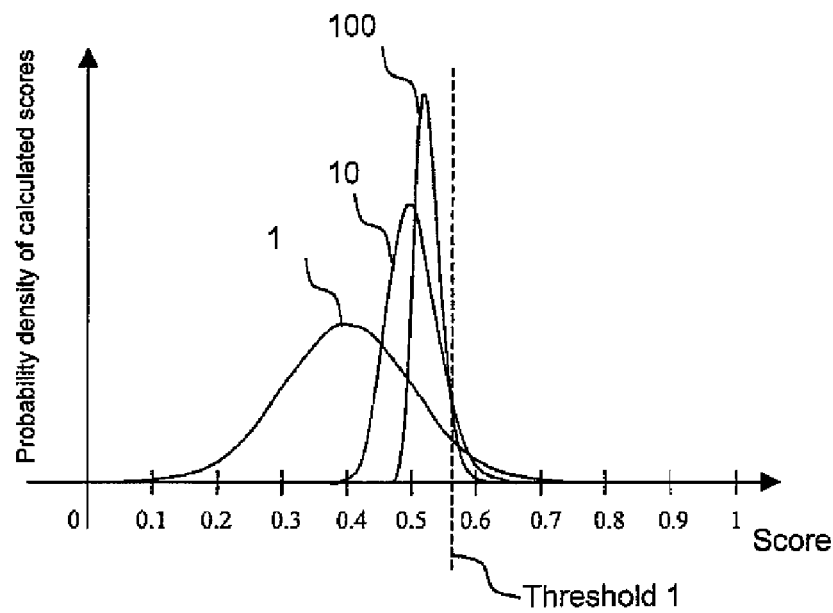

By using the above-described score adjustment parameter, the distributions shown in FIG. 3A can be adjusted so as to become close to one another, as shown in FIG. 3B. In the example of FIG. 3B, the stranger can be excluded using the threshold 1 analogously in all the conditions. That is, the use of the above-described score adjustment parameter brings about an effect of making the stranger acceptance rate substantially constant.

<Score Adjustment Parameter 2>

Next, a case where the face size is used as the condition is described. Specifically, a difference in face size (a number of pixels in a face area) detected by the face detector 12 between the registrant and the collation object person is used as the condition.

Figure 4A:
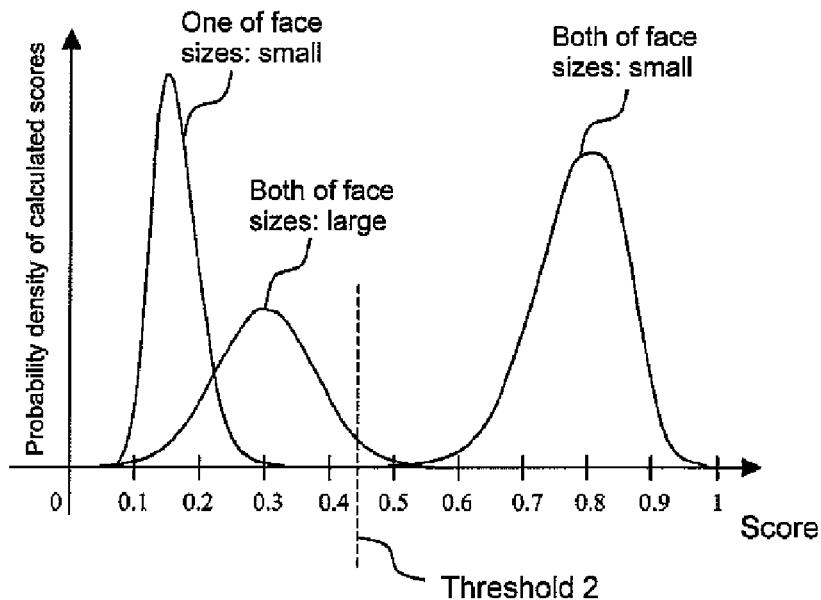
FIG. 4 shows a diagram illustrating one example of the score adjustment parameter, FIG. 4A showing a schematic diagram indicating score calculation results with a face size used as a condition when a plurality of stranger images are used, and FIG. 4B showing a schematic diagram indicating scores adjusted in accordance with the face size.

FIG. 4A is a schematic diagram indicating calculation results of scores by the score calculator 15 when a plurality of stranger images are used. FIG. 4A is a graph with a horizontal axis defined as the "score", and with a vertical axis defined as the "probability density of the calculated scores". That is, FIG. 4A indicates "what degree of score is likely to be calculated when the strangers are subjected to the face collation" on each condition.

As shown in FIG. 4A, if the detected face sizes of the registrant and the collation object person are both large, the numbers of pixels in the detected face areas are both large, and thus, accurate feature quantities can be extracted from both of the faces. As a result, an adequate score can be calculated, so that high-accuracy face collation can be performed. However, if one face size is large, and the other face size is small, an accurate feature quantity cannot be extracted from the small face because the number of pixels in the area of the small face is small. As a result, the analogy degree in feature quantity between the images of the large face size and the small face size also becomes low, so that a lower score is calculated (FIG. 4A). Moreover, if both of the face sizes are small, even in the case of faces of the different persons, the numbers of pixels in the face areas are small, and thus it is difficult to distinguish the faces, which makes the analogy degree of the feature quantity higher, so that a higher score is calculated (FIG. 4A).

In this case, if a threshold 2 is set to a value (score) that can appropriately exclude the stranger when the face sizes are both large as shown in FIG. 4A, the stranger cannot be appropriately excluded in the case where the face sizes are different or in the case where the face sizes are both small. Consequently, in the present embodiment, the following expressions are used to adjust the score.

If the score calculated by the score calculator 12 is S, the score after adjustment is S', the face size (number of pixels in the face area) detected from the registration image is $R_X$, the face size detected from the collation image is $R_X'$, and the score adjustment parameter is P, $$S'=S/P$$

$$P=f(R_X,R_X')$$

However, in the case where one of the face sizes is small, a lower score is calculated, and in the case where the face sizes are both small, a higher score is calculated, as compared with the case where the face sizes are both large, and accordingly, when $R_1<R_2$, $R_1'<R_2'$, $R_1=R_1'$, and $R_2=R_2'$, $f(R_X, R_X')$ is as follows:

$$f(R_1,R_2')=f(R_2,R_1')<f(R_2,R_2')<f(R_1,R_1')$$

In the present embodiment, $R_1=R_1'=50,000$ pixels, $R_2=R_2'=200,000$ pixels, and $f(R_1, R_2')=f(R_2, R_1')=0.5$, $f(R_2, R_2')=1$, and $f(R_1, R_1')=2$.

Figure 4B:
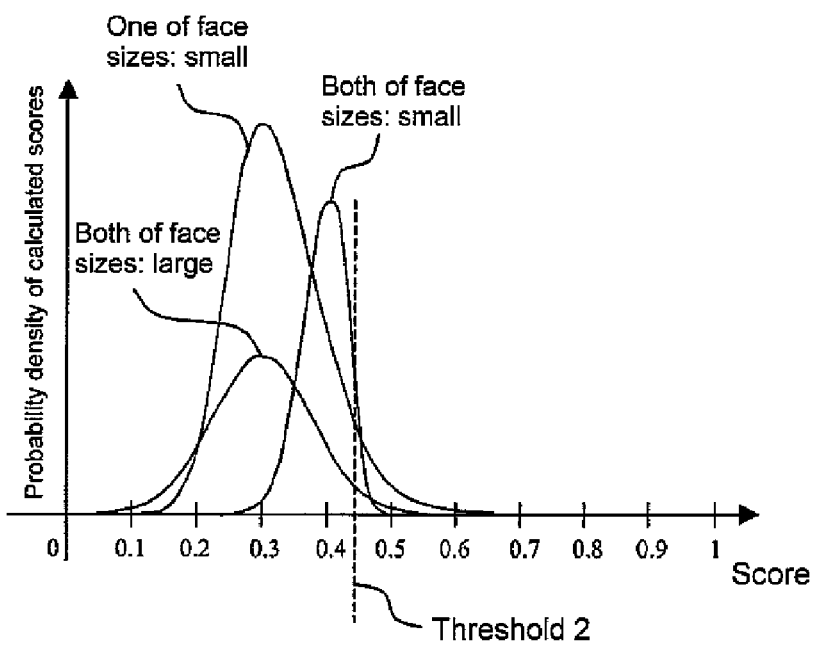

By using the above-described score adjustment parameter, the respective distributions shown in FIG. 4A can be adjusted so as to become close to one another as shown in FIG. 4B. In the example of FIG. 4B, the stranger can be excluded using the threshold 2 analogously in all the conditions. That is, the use of the above-described score adjustment parameter brings about the effect of making the stranger acceptance rate substantially constant.

<Specific Examples of Score Adjustment Method in Other Conditions>

FIG. 5 shows specific examples of the various registration conditions and the collation conditions, items assumed to be caused by differences of the relevant conditions, and rough score adjustment methods for the items. Hereinafter, the respective conditions shown in FIG. 5 are described.

First, a case where a number of registrants is used as the condition is described. As described before (in the score adjustment parameter 1), the larger the number of registrants is, the higher the probability that a stranger resembles a registrant is. Therefore, the score of the stranger is calculated so as to be higher, which makes the acceptance of the stranger easier. In this case, as the score adjustment parameter, a score adjustment parameter that makes the score lower as the number of registrants increases may be considered.

Next, a case where a number of registration images of the relevant registrant is used as the condition is described. In this case, similar to the case where the number of registrants is used as the condition, the larger the number of registration images of the relevant registrant is, the higher the probability that a stranger resembles the registrant is. Therefore, the score of the stranger is calculated so as to be higher, which makes the acceptance of the stranger easier. In this case, as the score adjustment parameter, a score adjustment parameter that makes the score lower when the collation of the registrant whose number of registration images is larger is performed may be considered.

Next, a case where an elapsed time since the registration image is photographed is used as the condition is described. The elapsed time is a difference between a photographing date of the registration image and a photographing date of the collation image. For example, in the case where the photographing date of the registration image is much older than the photographing date of the collation image, the probability that the registration image and the collation image are not analogous is high even if they are images of the same person (for example, in many cases, the feature quantity is not analogous between a face in childhood and a face in adulthood). Therefore, the score of the principal is calculated so as to be lower, thus the principal is likely to be rejected. In this case, as the score adjustment parameter, a score adjustment parameter that makes the score higher as the elapsed time becomes longer may be considered.

Next, a case where a photographing number of the collation images is used as the condition is described. The photographing number is a number of images that the collation object person uses for the collation. For example, in the case where a face image photographed by a video camera or the like is inputted, some face collation apparatuses have a constitution in which as the collation object person stays longer in a photographing region of the relevant video camera, more collation images are inputted. In these apparatuses, if the collation is performed using an input image of the highest score among the plurality of input images, the larger the number of the inputted images is, the higher the probability that a face image analogous to a registrant is inputted is. Therefore, the score of the stranger is calculated so as to be higher, which makes the acceptance of the stranger easier. In this case, as the score adjustment parameter, a score adjustment parameter that makes the score lower as the photographing number of the collation images increases may be considered.

Next, a case where an S/N ratio of each of the imaging device used for photographing of the registration image and the imaging device used for photographing of the collation image is used as the condition is described. Similar to the face size described before (in the score adjustment parameter 2), if both of the images are photographed by the imaging devices each having a high S/N ratio, an adequate score is calculated, although if one of the imaging devices has a low S/N ratio, a lower score is calculated, and if both have low S/N ratios, a higher score is calculated. Therefore, the stranger cannot be appropriately excluded in accordance with the situation. In this case, as the score adjustment parameter, a score adjustment parameter that makes the score higher in accordance with the difference in S/N ratio when one of the imaging devices has a low S/N ratio, and that makes the score lower in accordance with the S/N ratios when both the imaging devices have low S/N ratios may be considered.

Next, a case where a shutter speed of each of the imaging device used for photographing of the registration image and the imaging device used for photographing of the collation image is used as the condition is described. When photographed by an imaging device having a higher shutter speed, an image becomes darker. When photographed by an imaging device having a lower shutter speed, the image becomes lighter. Therefore, an accurate feature quantity cannot be extracted from the above-described images. That is, if both of the images are photographed by the imaging devices having higher (or lower) shutter speeds, the score is calculated to be higher, and if one of the images is photographed by the imaging device having the higher (or lower) shutter speed, the score is calculated so as to be lower. As a result, the stranger cannot be appropriately excluded in accordance with the situation. In this case, as the score adjustment parameter, a score adjustment parameter that makes the score higher in accordance with the difference in shutter speed when one of the imaging devices has a higher (lower) shutter speed, and that makes the score lower in accordance with the shutter speed when both the imaging devices have higher (or lower) shutter speeds may be considered.

Next, a case where an exposure degree of each of the registration image and the collation image is used as the condition is described. Similar to the case where the shutter speed is used as the condition, when the exposure degree is lower, an image becomes darker, and when the exposure degree is higher, the image becomes lighter. Therefore, an accurate feature quantity cannot be extracted from the above-described images. That is, if the exposure degrees of both of the images are lower (or higher), the score is calculated to be higher, and if the exposure degree of one of the images is lower (or higher), the score is calculated so as to be lower. As a result, the stranger cannot be appropriately excluded in accordance with the situation. In this case, as the score adjustment parameter, a score adjustment parameter that makes the score higher in accordance with the difference in exposure degree when the exposure degree of one of the images is lower (or higher), and that makes the score lower in accordance with the exposure degree when the exposure degrees of both of the images are lower (or higher) may be considered.

Next, a case where a focal distance is used as the condition is described. For example, whether or not the focal distance is appropriate with respect to a distance between a lens and a subject in the registration image and the collation image is used as the condition. When the focal distance is appropriate, a clear image is photographed, while when the focal distance is inappropriate, a blurred image is obtained. Therefore, an accurate feature quantity cannot be extracted from the image photographed in a state where the focal distance is inappropriate. That is, if both of the images are photographed in the state where the focal distance is inappropriate, the score is calculated so as to be higher, and if one of the images is photographed in the state where the focal distance is inappropriate, the score is calculated so as to be lower. As a result, the stranger cannot be appropriately excluded in accordance with the situation. In this case, as the score adjustment parameter, a score adjustment parameter that makes the score higher in accordance with the difference in blur degree (blur quantity) of the images when one of the images is photographed in the state where the focal distance is inappropriate, and that makes the score lower in accordance with the blur quantity when both of the images are photographed in the state where the focal distance is inappropriate may be considered.

Next, a case where the face size detected from each of the registration image and the collation image is used as the condition is described. As described before (in the score adjustment parameter 2), if both of the face sizes are large, an adequate score is calculated, although if one of the face sizes is small, a lower score is calculated, and if both of the face sizes are small, a higher score is calculated. Therefore, the stranger cannot be appropriately excluded in accordance with the situation. In this case, as the score adjustment parameter, a score adjustment parameter that makes the score higher in accordance with the difference in face size when one of the face sizes is small, and that makes the score lower in accordance with the face size when both of the face sizes are small may be considered.

Next, a case where a lighting environment of a face detected from each of the registration image and the collation image is used as the condition is described. When the lighting environment is "dark", "light", or "in an oblique lighting state", an accurate feature quantity cannot be extracted. Therefore, if "the lighting environments are not in a follow light state", and "the lighting environments are the same", a higher score is calculated. On the other hand, if "the lighting environments are different", a lower score is calculated. As a result, the stranger cannot be appropriately excluded in accordance with the situation. In this case, as the score adjustment parameter, a score adjustment parameter that makes the score higher in accordance with the difference in lighting environment when "the lighting environments are different", and that makes the score lower in accordance with the lighting environment when "the lighting environment are not in a follow light state", and "the lighting environments are the same" may be considered.

Next, a case where invisibility of a face organ detected from each of the registration image and the collation image (for example, invisibility of the face organs due to hair, sunglasses, mask or the like) is used as the condition is described. When there is invisibility of an organ of the detected face, an accurate feature quantity cannot be extracted from the organ. Therefore, if invisibility of the same organ occurs in both of the images, a higher score is calculated. If invisibility of different organs occurs in both of the images, a lower score is calculated. As a result, the stranger cannot be appropriately excluded in accordance with the situation. In this case, as the score adjustment parameter, a score adjustment parameter that makes the score higher when invisibility occurs in different organs, and that makes the score lower when invisibility occurs in the same organ may be considered. An adjustment quantity of the score may be determined in accordance with a percentage of the invisibility of the organ(s) with respect to the entire face, or the like.

Next, a case where a face direction detected from each of the registration image and the collation image is used as the condition is described. When a face image of a certain person is photographed to extract a feature quantity, the feature quantity differs depending on the direction of the face. Therefore, if the face directions are the same in both of the images, an adequate score is calculated (obviously, it is ideal that in both of the images, the face is directed frontally). If the face directions are different, a lower score is calculated. Therefore, the principal is likely to be rejected. In this case, as the score adjustment parameter, a score adjustment parameter that makes the score higher as the face direction differs more may be considered.

Next, a case where a facial expression detected from each of the registration image and the collation image is used as the condition is described. When a face image of a certain person is photographed to extract a feature quantity, the feature quantity differs depending on the expression of the face. Therefore, if the facial expressions are the same in both of the images, an adequate score is calculated (obviously, it is ideal that in both of the images, the face is straight). If the facial expressions are different, a lower score is calculated. Therefore, the principal is likely to be rejected. In this case, as the score adjustment parameter, a score adjustment parameter that makes the score higher as the facial expression differs more may be considered.

Next, a case where physical features (hairstyle, body height, body type and the like) of a person detected from each of the registration image and the collation image) are used as the condition is described. By adjusting the score calculated from the face feature quantity (feature quantity extracted from the face image) in accordance with the physical features, an adequate score can be obtained. Specifically, if a face of a stranger resembles a face of a registrant, a higher score is calculated. As a result, the stranger cannot be appropriately excluded in accordance with the situation. In this case, as the score adjustment parameter, a score adjustment parameter that makes the score lower as the hair style, body height, body type and the like differ more may be considered.

Next, a case where attributes (gender, age and the like) of a person detected from each of the registration image and the collation image are used as the condition is described. By adjusting the score calculated from the face feature quantity (feature quantity extracted from the face image) in accordance with the attributes, an adequate score can be obtained. Specifically, if a face of a stranger resembles a face of a registrant, a higher score is calculated. As a result, the stranger cannot be appropriately excluded in accordance with the situation. In this case, as the score adjustment parameter, a score adjustment parameter that makes the score lower as the age, gender and the like are different may be considered. With the age, as it differs more, the score may be made lower.

Next, a case where reliability of a face detected from the collation image is used as the condition is described. The reliability of face detection, for example, indicates a degree of face likeness of the detected face. When the reliability of the face detection is high, the probability that the detected face is a "face" is high. On the other hand, when the reliability of the face detection is low, the probability that the detected face is a "non-face" becomes higher. Therefore, if the reliability of the face detected from the collation image is high, an adequate score is calculated, while if the reliability is low, the reliability of the score also becomes low. The acceptance of the collation object person having low reliability in score as a registrant increases the probability of the acceptance of a stranger, and thus, such a collation object person should not be accepted. In this case, as the score adjustment parameter, a score adjustment parameter that makes the score lower as the reliability of the face detection becomes lower may be considered.

Next, a case where reliability of a feature quantity extracted from a face of a collation object person is used as the condition is described. With reliability of the feature quantity, similar to the case where the reliability of the face detection is used as the condition, if the reliability of the feature quantity is high, an adequate score is calculated, while if the reliability is low, the reliability of the score also becomes low. The acceptance of the collation object person having low reliability in score as a registrant increases the probability of the acceptance of a stranger, and thus, such a collation object person should not be accepted. In this case, as the score adjustment parameter, a score adjustment parameter that makes the score lower as the reliability of the feature quantity becomes lower may be considered.

The adjustment of the score as described above can make the stranger acceptance rate substantially constant. The score adjustment parameter for adjusting in this manner can be defined by using a plurality of images of strangers corresponding to the respective conditions to find (learn) in advance "what degree of score is calculated when a stranger is collated on the relevant condition". Moreover, the above-described respective conditions may be combined with one another, or may be combined with a condition other than the above-described conditions. In this case, "how the score fluctuates on the combined conditions" is important.

While in the present embodiment, how much the score is adjusted by the score adjustment parameter has not been described in detail, with the adjustment quantity of the score, any degree of adjustment may be performed as long as the difference in score due to the difference in condition becomes smaller as compared with that before the adjustment. At least by the above-described adjustment, stable face collation, which is less affected by the condition as compared with that before the adjustment, can be performed.

Figure 6:
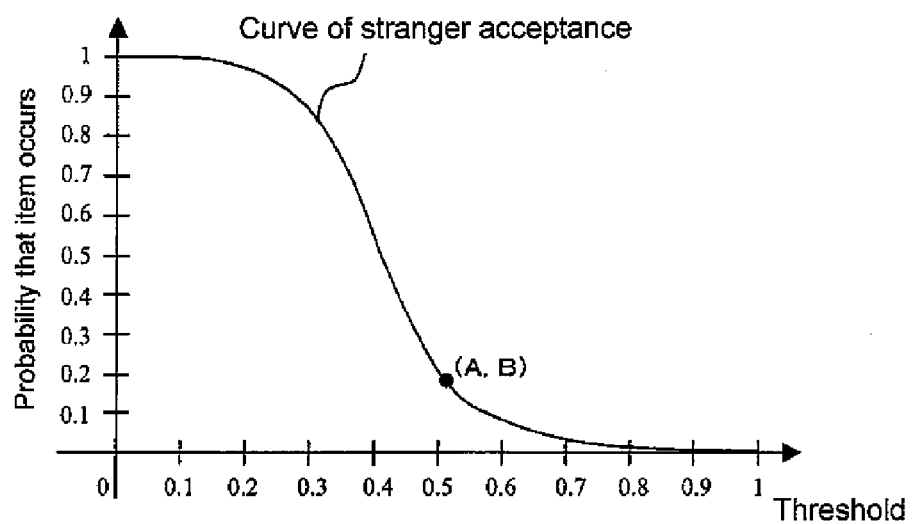
FIG. 6 shows a diagram illustrating change in stranger acceptance rate with respect to change in threshold.

Determining the score adjustment parameter by the above-described learning or the like can make the stranger acceptance rate more constant regardless of the condition. For example, by such learning, a graph of the stranger acceptance rate with respect to a threshold as shown in FIG. 6 can be created for each of the conditions (in FIG. 6, a curve with respect to only one condition is illustrated). As shown in FIG. 6, if the threshold is A, the stranger acceptance rate is B. For the other conditions, the score on each of the conditions is adjusted so that the threshold when the stranger acceptance rate is B is A, which can make the stranger acceptance rate constant regardless of the condition.

Figure 7:
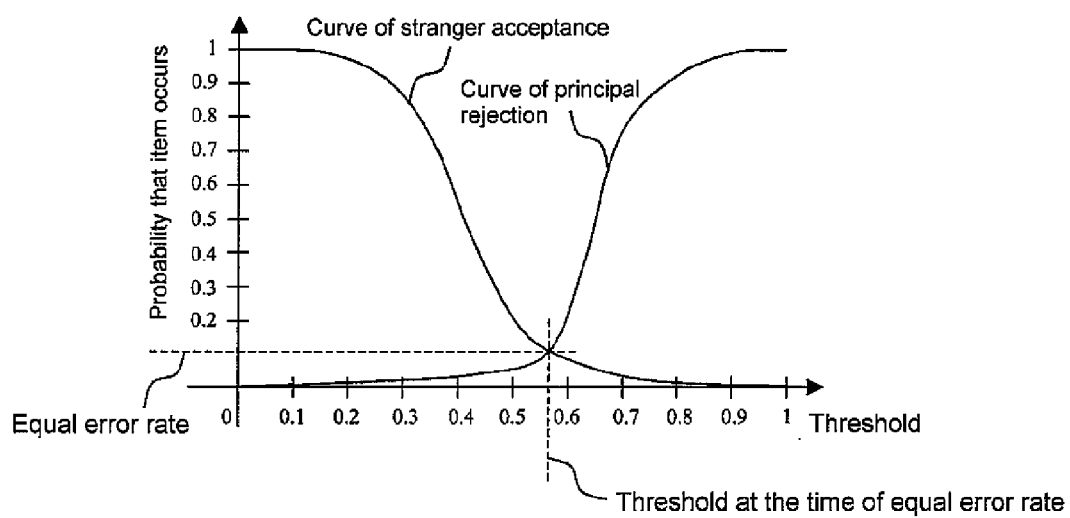
FIG. 7 shows a diagram illustrating change in stranger acceptance rate and principal rejection rate with respect to change in threshold.

For the registrants, by performing learning on the various conditions, a graph of the probability that a principal is rejected with respect to a threshold (principal rejection rate) as shown in FIG. 7 can be also obtained. The score adjustment parameter may be a parameter that makes the principal rejection rate substantially constant regardless of the condition. Moreover, an intersecting point of curves of the stranger acceptance rate and the principal rejection rate is referred to as an "equal error rate", and this equal error rate is a value that is generally evaluated. The score adjustment parameter may be a parameter that makes the equal error rate substantially equal regardless of the condition. Here, making the equal error rate substantially equal regardless of the condition means making substantially equal the threshold at the time of the equal error rate, or a pair of the equal error rate and the threshold at the time of equal error rate, regardless of the condition.

<Second Embodiment>

In a second embodiment, in order to perform efficient and stable face collation, a constitution in which the threshold is automatically adjusted in accordance with the condition is described.

<Apparatus Configuration>

Figure 8:
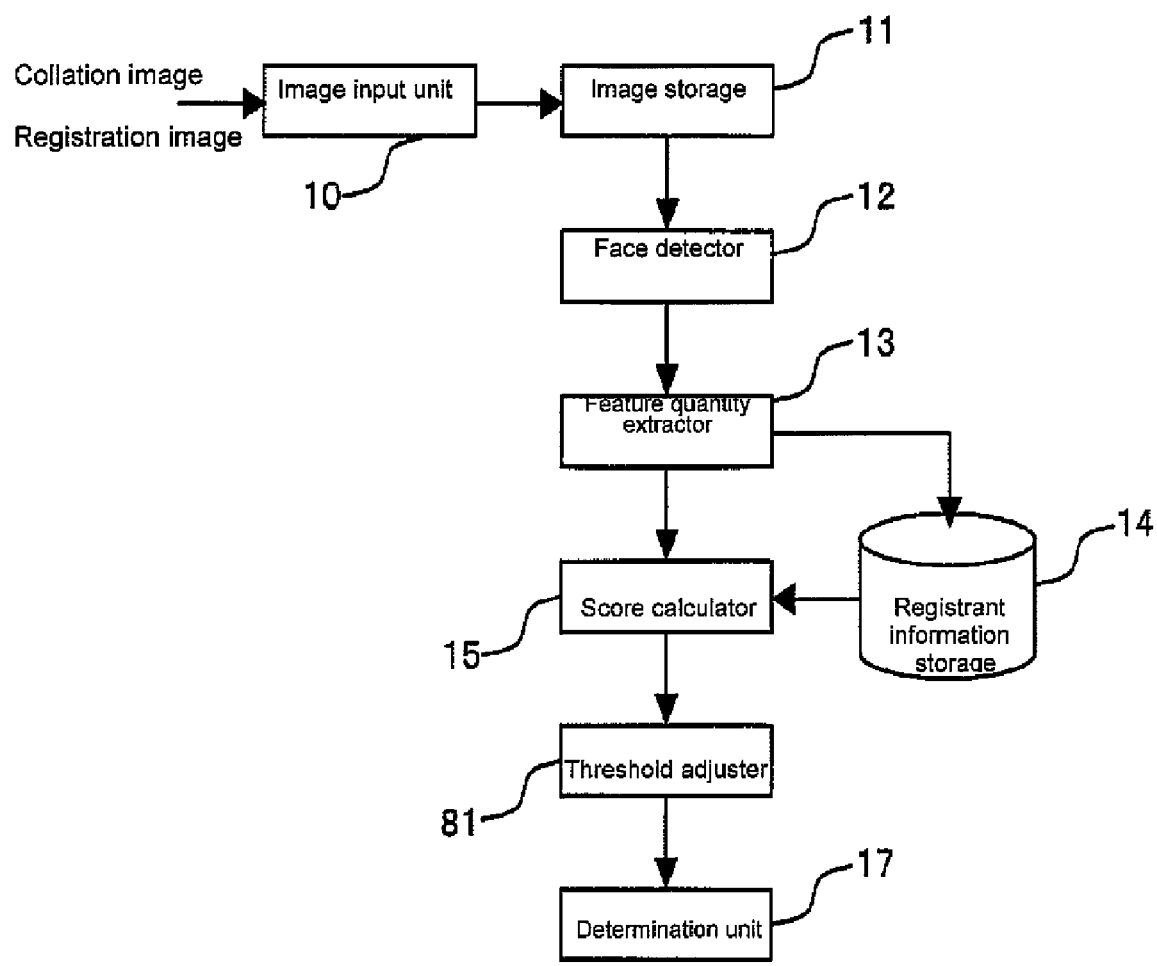
FIG. 8 shows a block diagram illustrating a functional configuration of a face collation apparatus according to a second embodiment.

FIG. 8 is a block diagram showing a functional configuration of a face collation apparatus according to the second embodiment of the present invention. The face collation apparatus according to the second embodiment includes a threshold adjuster 81 in place of the score adjuster 16 included in the face collation apparatus according to the first embodiment. Functions similar to those described in the first embodiment are given the same reference numerals, and their descriptions are omitted.

The threshold adjuster 81 has a function of adjusting a predetermined threshold using a threshold adjustment parameter. The threshold adjustment parameter may be incorporated in the face collation apparatus as a program, or a constitution may be employed in which the threshold adjustment parameter is stored in a storage device in advance, and is read from the storage device as needed. The threshold adjustment parameter is a parameter enabling the threshold to be adjusted so that the stranger acceptance rate becomes substantially constant regardless of the registration condition and the collation condition.

<Face Collation Function>

Figure 9:
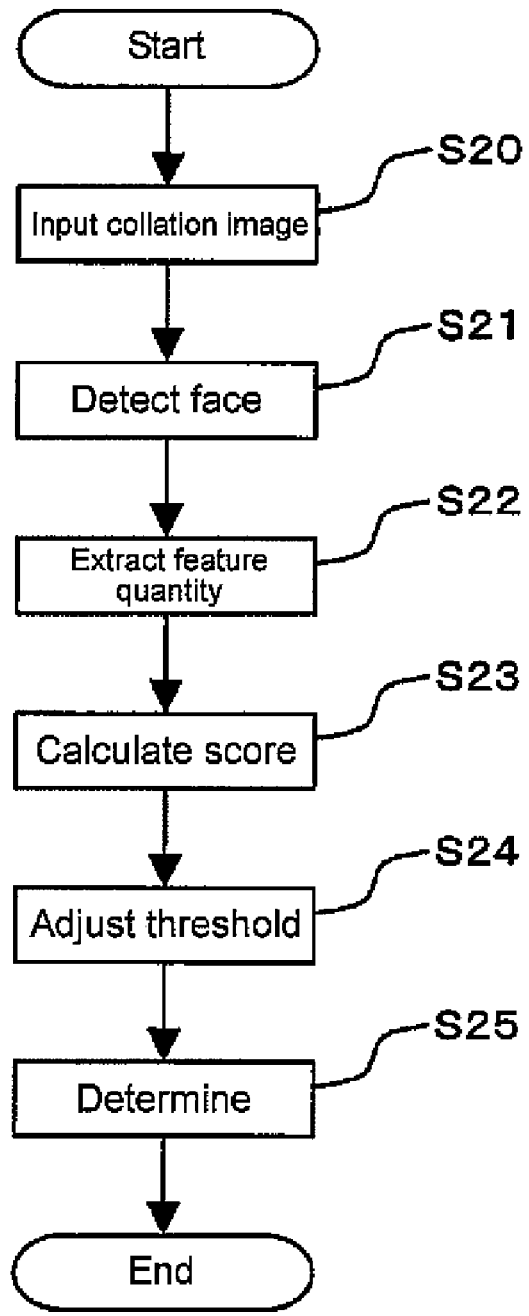
FIG. 9 shows a flowchart illustrating a flow of processing of the face collation apparatus according to the second embodiment.

A flow of a configuration and processing of the face collation function is described along a flowchart in FIG. 9.

Since a series of processing in steps S20 to S23 is similar to a series of processing in steps S10 to S13 in FIG. 2, their descriptions are omitted.

Next to step S23, the threshold adjuster 81 adjusts the predetermined threshold using the threshold adjustment parameter (step S24).

Since processing in step S25 is similar to the processing in step S15 in FIG. 2, the description thereof is omitted.

Now, examples of the threshold adjustment parameter are described.

<Threshold Adjustment Parameter 1>

As described above, the threshold adjustment parameter is for adjusting the predetermined threshold. Specifically, the threshold adjustment parameter is determined so as to restrain fluctuations in stranger acceptance rate due to a difference in registration condition and collation condition.

Hereinafter, a case where the number of registrants (1, 10, 100) is used as the condition is described.

Figure 10A:
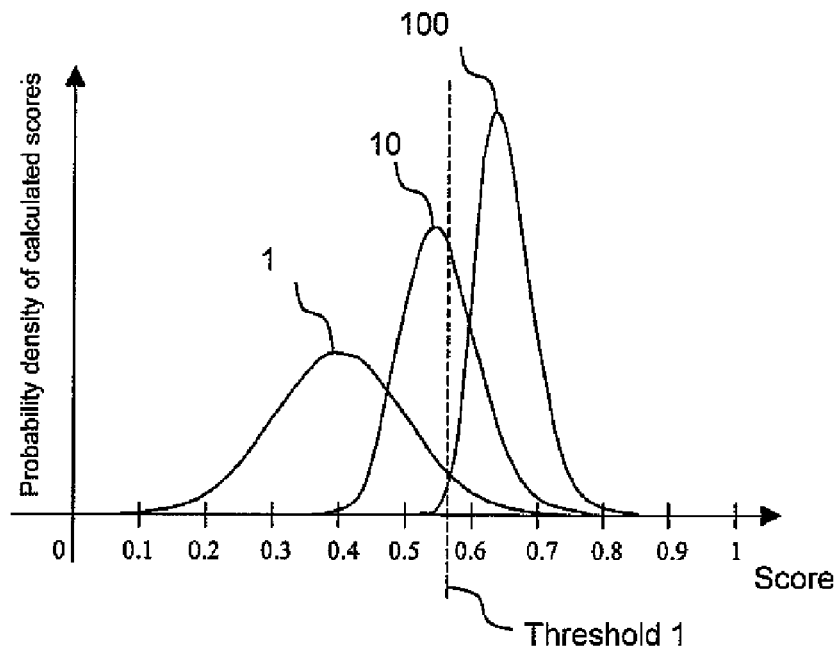
FIG. 10 shows a diagram indicating one example of a threshold adjustment parameter, FIG. 10A showing a schematic diagram indicating score calculation results with a number of registrants used as a condition when a plurality of stranger images are used, and FIG. 10B showing a schematic diagram indicating thresholds adjusted in accordance with the number of registrants.

Since FIG. 10A is similar to FIG. 3A, the description thereof is omitted.

In the present embodiment, the following expressions are used to adjust the threshold.

If the predetermined threshold is $S_L$, the threshold after adjustment is $S_L'$, the number of registrants is N, and the threshold adjustment parameter is $P_L$, $$S_L' = S_L \times P_L$$

$$P_L = f(N) = A + B \times \log N$$

where A, B are coefficients. In the present embodiment, the coefficient A=1, and the coefficient B=0.5.

Figure 10B:
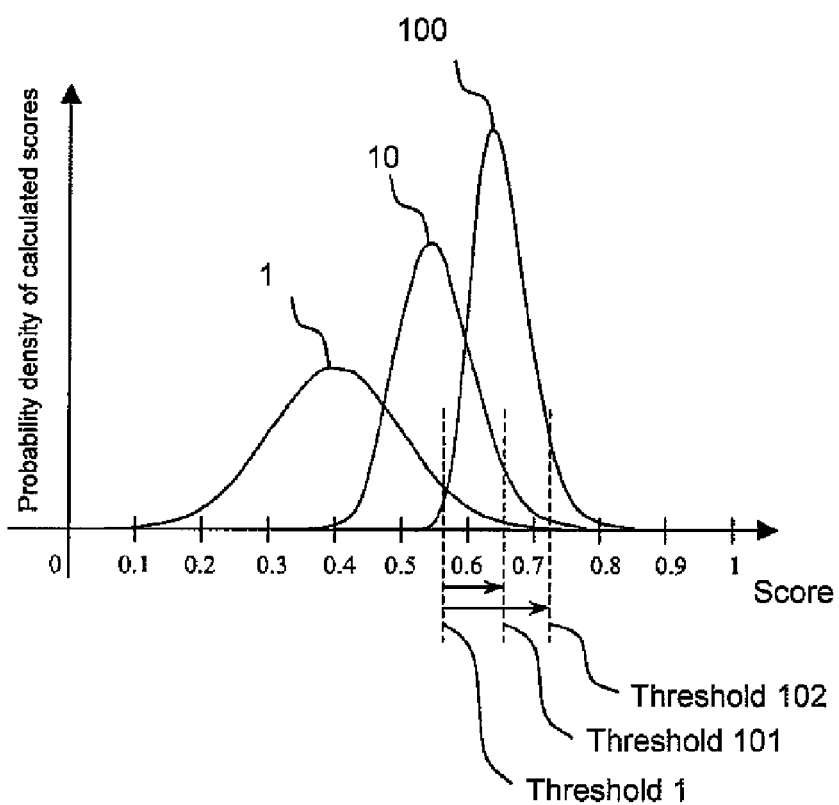

By using the above-described threshold adjustment parameter, the threshold 1 shown in FIG. 10A can be adjusted so that a relation between a distribution and a threshold is the same in the respective distributions as shown in FIG. 10B. In an example of FIG. 10B, the threshold is adjusted so that when the number of registrants is one, the determination is performed, using the threshold 1, when the number of registrants is 10, the determination is performed using a threshold 101, and when the number of registrants is 100, the determination is performed using a threshold 102. This allows the stranger to be excluded similarly on all the conditions. That is, the use of the threshold adjustment parameter brings about the effect of making the stranger acceptance rate substantially constant.

<Threshold Adjustment Parameter 2>

Next, a case where a difference in face size (number of pixels in the face area) detected by the face detector 12 between the registrant and the collation object person is used as the condition is described.

Figure 11A:
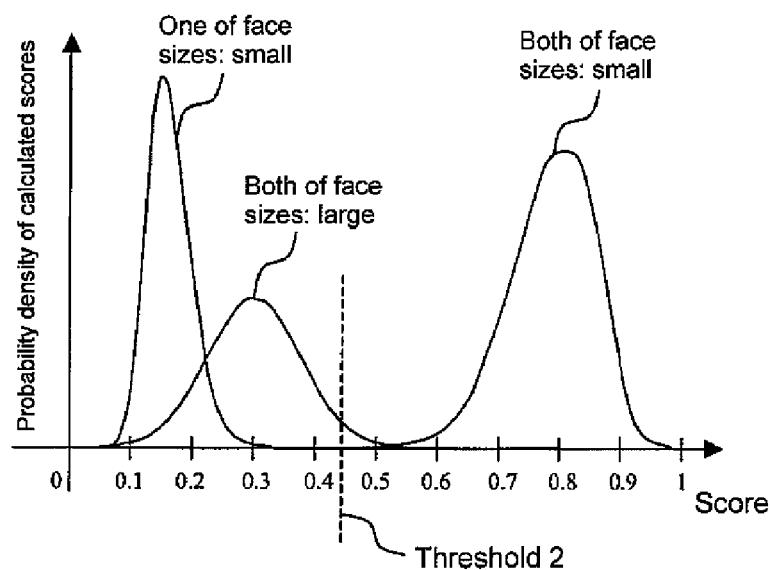
FIG. 11 shows a diagram illustrating one example of the score adjustment parameter, FIG. 11A showing a schematic diagram indicating score calculation results with a face size used as a condition when a plurality of stranger images are used, and FIG. 11B showing a schematic diagram indicating thresholds adjusted in accordance with the face size.

Since FIG. 11A is similar to FIG. 4A, the description thereof is omitted.

In the present embodiment, the following expressions are used to adjust the threshold.

If the predetermined threshold is $S_L$, the threshold after adjustment is $S_L'$, the face size detected from the registration image is $R_X$, the face size detected from the collation image is $R_{X'}$, and the threshold adjustment parameter is $P_L$, $$S_L' = S \times P_L$$

$$P_L = f(R_X, R_{X'})$$

Also, in the present embodiment, similar to the example of FIG. 4, in the case where one of the face sizes is small, a lower score is calculated, and in the case where the face sizes are both small, a higher score is calculated, as compared with the case where the face sizes are both large, and accordingly, if $R_1 < R_2$, $R_1' < R_2'$, $R_1 = R_1'$, and $R_2 = R_2'$, $$f(R_1, R_2') = f(R_2, R_1') < f(R_2, R_2') < f(R_1, R_1')$$

where $R_1 = R_1' = 50{,}000$ pixels, $R_2 = R_2' = 200{,}000$ pixels, and $f(R_1, R_2') = f(R_2, R_1') = 0.5$, $f(R_2, R_2') = 1$, and $f(R_1, R_1') = 2$.

Figure 11B:
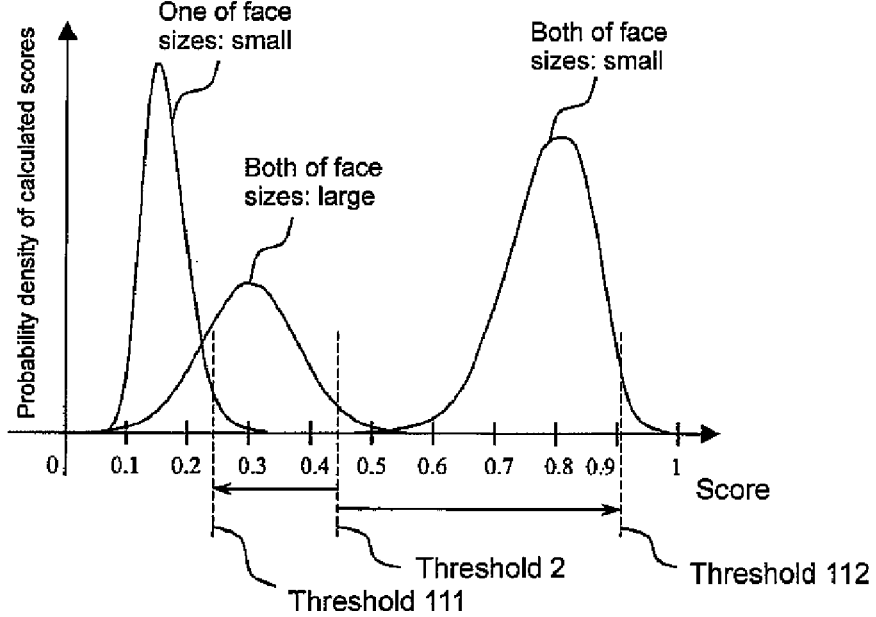

By using the above-described threshold adjustment parameter, the threshold 2 shown in FIG. 11A can be adjusted so that a relation between a distribution and a threshold is the same in the respective distributions as shown in FIG. 11B. In an example of FIG. 11B, the threshold is adjusted so that when both of the face sizes are larger the determination is performed using the threshold 1, when one of the face sizes is small, the determination is performed using a threshold 111, and when both of the face sizes are small, the determination is performed using a threshold 112. That is, the use of the threshold adjustment parameter brings about the effect of making the stranger acceptance rate substantially constant.

<Specific Examples of Threshold Adjustment Method in Other Conditions>

From the specific examples of the above-described threshold adjustment parameter, it is understood that in an adjustment method of the threshold, processing opposite to the adjustment of the score in the first embodiment is applied to the threshold. For example, while in the first embodiment, the adjustment for decreasing the score is performed, in the present embodiment, the adjustment for increasing the threshold is performed. That is, the reverse processing of the adjustment method of the score described referring to FIG. 5 in the first embodiment corresponds to the adjustment method of the threshold. Therefore, for specific examples of the threshold adjustment method, the description of FIG. 5 in the first embodiment is referred to, and their descriptions are omitted.

As the threshold adjustment method, one that makes the principal rejection rate or the equal error rate constant may be employed, as in the above-described score adjustment method.

What is claimed is:

1. A face collation apparatus comprising:
   a storage that stores a feature quantity of at least one registrant, the feature quantity being extracted from a registration image of the registrant;
   a feature quantity extractor that extracts a feature quantity from a collation image of a collation object person;
   a score calculator that calculates a score indicating an analogy degree between the feature quantity of the registrant and the feature quantity of the collation object person;
   a score adjuster that adjusts the score using a score adjustment parameter so that any one of a stranger acceptance rate indicating a probability that a stranger is accepted at the time of collation, a principal rejection rate indicating a probability that a principal is rejected at the time of collation, and an equal error rate, which is a probability that the stranger acceptance rate and the principal rejection rate are equal, becomes substantially constant regardless of a registration condition and a collation condition; and
   a determination unit that determines whether the collation object person is the registrant by comparing the adjusted score and a predetermined threshold.

2. A face collation apparatus comprising:
   a storage that stores a feature quantity of at least one registrant, the feature quantity being extracted from a registration image of the registrant;
   a feature quantity extractor that extracts a feature quantity from a collation image of a collation object person;

a score calculator that calculates a score indicating an analogy degree between the feature quantity of the registrant and the feature quantity of the collation object person;

a threshold adjuster that adjusts a predetermined threshold for determining whether the collation object person is the registrant using a threshold adjustment parameter so that any one of a stranger acceptance rate indicating a probability that a stranger is accepted at the time of collation, a principal rejection rate indicating a probability that a principal is rejected at the time of collation, and an equal error rate, which is a probability that the stranger acceptance rate and the principal rejection rate are equal, becomes substantially constant regardless of a registration condition and a collation condition; and a determination unit that determines whether the collation object person is the registrant by comparing the calculated score and the adjusted threshold.

3. The face collation apparatus according to claim 1, wherein the registration condition at least includes a number of registrants, a number of registration images of the relevant registrant, a property of an imaging device that photographs the registration image, or a face size, a lighting environment, invisibility of a face organ, a face direction or change in facial expression in the registration image.

4. The face collation apparatus according to claim 1, wherein the collation condition at least includes an elapsed time since the registration image is photographed, a property of an imaging device that photographs the collation image, a photographing number of collation images, or a face size, a lighting environment, invisibility of a face organ, a face direction, change in facial expression, reliability of face detection or reliability of the feature quantity in the collation image.

5. The face collation apparatus according to claim 1, wherein if the score calculated by the score calculator is S, the score after adjustment is S', the number of registrants is N, and the score adjustment parameter is P, $$S'=S/P$$

$$P=f(N)=A+B\times\log N$$

where A, B are coefficients.

6. The face collation apparatus according to claim 1, wherein if the score calculated by the score calculator is S, the score after adjustment is S', the face size detected from the registration image is $R_X$, the face size detected from the collation image is $R_X'$, and the score adjustment parameter is P, $$S'=S/P$$

$$P=f(R_X, R_X'),$$

where if $R_1 < R_2$, $R_1' < R_2'$, $R_1=R_1'$, and $R_2=R_2'$, $f(R_X, R_X')$ is as follows:

$$f(R_1, R_2')=f(R_2, R_1') < f(R_2, R_2') < f(R_1, R_1').$$

7. The face collation apparatus according to claim 2, wherein if the predetermined threshold is $S_L$, the threshold after adjustment is $S_L'$, the number of registrants is N, and the threshold adjustment parameter is $P_L$, $$S_L'=S_L\times P_L$$

$$P_L=f(N)=A+B\times\log N$$

where A, B are coefficients.

8. The face collation apparatus according to claim 2, wherein if the predetermined threshold is $S_L$, the threshold after adjustment is $S_L'$, the face size detected from the registration image is $R_X$, the face size detected from the collation image is $R_X'$, and the threshold adjustment parameter is $P_L$, $$S_L'=S_L\times P_L$$

$$P_L=f(R_X, R_X')$$

where if $R_1 < R_2$, $R_1' < R_2'$, $R_1=R_1'$, and $R_2=R_2'$, $f(R_X, R_X')$ is as follows:

$$f(R_1, R_2')=f(R_2, R_1') < f(R_2, R_2') < f(R_1, R_1').$$

9. A face collation method wherein a computer executes the steps of:

storing a feature quantity of at least one or more registrant, the feature quantity being extracted from a registration image of the registrant, in a storage;

extracting a feature quantity from a collation image of a collation object person;

calculating a score indicating an analogy degree between the feature quantity of the registrant and the feature quantity of the collation object person;

adjusting the score using a score adjustment parameter so that any one of a stranger acceptance rate indicating a probability that a stranger is accepted at the time of collation, a principal rejection rate indicating a probability that a principal is rejected at the time of collation, and an equal error rate, which is a probability that the stranger acceptance rate and the principal rejection rate are equal, becomes substantially constant regardless of a registration condition and a collation condition; and determining whether or not the collation object person is the registrant by comparing the adjusted score and a predetermined threshold.

10. A face collation method wherein a computer executes the steps of:

storing a feature quantity of at least one or more registrants, the feature quantity being extracted from a registration image of the registrant, in a storage;

extracting a feature quantity from a collation image of a collation object person;

calculating a score indicating an analogy degree between the feature quantity of the registrant and the feature quantity of the collation object person;

adjusting a predetermined threshold for determining whether or not the collation object person is the registrant using a threshold adjustment parameter so that any one of a stranger acceptance rate indicating a probability that a stranger is accepted at the time of collation, a principal rejection rate indicating a probability that a principal is rejected at the time of collation, and an equal error rate, which is a probability that the stranger acceptance rate and the principal rejection rate are equal, becomes substantially constant regardless of a registration condition and a collation condition; and determining whether or not the collation object person is the registrant by comparing the calculated score and the adjusted threshold.

11. A non-transitory computer readable medium storing a face collation program comprising functionality to cause a computer to perform:

storing a feature quantity of at least one or more registrants, the feature quantity being extracted from a registration image of the registrant, in a storage;

extracting a feature quantity from a collation image of a collation object person;

calculating a score indicating an analogy degree between the feature quantity of the registrant and the feature quantity of the collation object person;

adjusting the score using a score adjustment parameter so that any one of a stranger acceptance rate indicating a probability that a stranger is accepted at the time of collation, a principal rejection rate indicating a probability that a principal is rejected at the time of collation, and an equal error rate, which is a probability that the stranger acceptance rate and the principal rejection rate are equal, becomes substantially constant regardless of a registration condition and a collation condition; and determining whether or not the collation object person is the registrant by comparing the adjusted score and a predetermined threshold.

12. A non-transitory computer readable medium storing a face collation program comprising functionality to cause a computer to perform:

storing a feature quantity of at least one or more registrants, the feature quantity being extracted from a registration image of the registrant, in a storage;

extracting a feature quantity from a collation image of a collation object person;

calculating a score indicating an analogy degree between the feature quantity of the registrant and the feature quantity of the collation object person;

adjusting a predetermined threshold for determining whether or not the collation object person is the registrant using a threshold adjustment parameter so that any one of a stranger acceptance rate indicating a probability that a stranger is accepted at the time of collation, a principal rejection rate indicating a probability that a principal is rejected at the time of collation, and an equal error rate, which is a probability that the stranger acceptance rate and the principal rejection rate are equal, becomes substantially constant regardless of a registration condition and a collation condition; and determining whether or not the collation object person is the registrant by comparing the calculated score and the adjusted threshold.

13. The face collation apparatus according to claim 2, wherein the registration condition at least includes a number of registrants, a number of registration images of the relevant registrant, a property of an imaging device that photographs the registration image, or a face size, a lighting environment, invisibility of a face organ, a face direction or change in facial expression in the registration image.

14. The face collation apparatus according to claim 2, wherein the collation condition at least includes an elapsed time since the registration image is photographed, a property of an imaging device that photographs the collation image, a photographing number of collation images, or a face size, a lighting environment, invisibility of a face organ, a face direction, change in facial expression, reliability of face detection or reliability of the feature quantity in the collation image.

15. The face collation apparatus according to claim 3, wherein the collation condition at least includes an elapsed time since the registration image is photographed, a property of an imaging device that photographs the collation image, a photographing number of collation images, or a face size, a lighting environment, invisibility of a face organ, a face direction, change in facial expression, reliability of face detection or reliability of the feature quantity in the collation image.

16. The face collation apparatus according to claim 13, wherein the collation condition at least includes an elapsed time since the registration image is photographed, a property of an imaging device that photographs the collation image, a photographing number of collation images, or a face size, a lighting environment, invisibility of a face organ, a face direction, change in facial expression, reliability of face detection or reliability of the feature quantity in the collation image.

\* \* \* \* \*